3,627,480
PRECIPITATED CALCIUM CARBONATE
James Derek Birchall, Northwich, England, assignor to Imperial Chemical Industries Limited, London, England
No Drawing. Filed July 24, 1969, Ser. No. 844,629
Claims priority, application Great Britain, Aug. 15, 1968, 39,025/68
Int. Cl. C01f *11/18;* C01d *3/04*
U.S. Cl. 23—66  4 Claims

ABSTRACT OF THE DISCLOSURE

Calcium carbonate in the aragonite phase and in the form of needle-shaped crystals having major axes of up to 100 microns and minor axes of 0.10 to 3.0 microns is made by adding a source of carbonate ions to an aqueous solution of a calcium salt at temperatures above 70° C. whilst maintaining the calcium carbonate supersaturation below a given maximum value.

---

This invention relates to precipitated calcium carbonate and particularly to the precipitation in the aragonite phase of calcium carbonate in the form of needle-shaped crystals.

The preparation of precipitated calcium carbonate in the calcite or aragonite phases, or as a mixture of the two, in particle-sizes from less than one micron to several microns in diameter is well-established, as also are its uses as a filler in rubber and plastics, as a constituent of paints and printing inks and in paper coating.

Individual crystals in commercially available precipitated calcium carbonate range in shape from rhombs to cones and almost spherical particles in calcite, and from irregular polygons to needle-shaped forms in aragonite.

I have now discovered a method for making precipitated calcium carbonate in the aragonite phase in a form in which individual crystals are markedly needle-shaped in that they have minor axes of about 0.10 to 3.0 microns and major axes of up to 100 microns.

The underlying general requirements in the process for making this form of precipitated calcium carbonate comprises the slow generation of carbonate ions in a solution of a calcium salt at a temperature above a given minimum value and the maintaining of the supersaturation of calcium carbonate below a given maximum value.

The invention thus provides a process for making precipitated calcium carbonate in the aragonite phase and possessing a markedly needle-shaped crystal form comprising adding a source of carbonate ions to an aqueous solution of a calcium salt, maintaining the temperature of the reaction mixture above 70° C. and controlling the rate of generation of carbonate ions in the reaction mixture in such a manner that the supersaturation ratio with respect to calcium carbonate, as hereinbefore defined, is from 1 to 5.

For the purpose of this specification the supersaturation ratio with respect to calcium carbonate is defined as the ratio of the concentration of dissolved calcium carbonate in the system at any time and at any given temperature to the equilibrium concentration of dissolved calcium carbonate in the system at the same temperature.

Preferably the supersaturation ratio is from 1.1 to 2.0 and the reaction temperature above 80° C.

The calcium salt may be any convenient water-soluble salt of calcium, for example calcium chloride, calcium nitrate, calcium acetate. The aqueous solution of calcium chloride may if desired be in the form of the liquors produced in that stage of the ammonia-soda process wherein ammonia is recovered from ammonium chloride by heating the latter with milk of lime. Any source of seeds having a calcite structure should preferably be excluded.

The source of carbonate ions includes soluble carbonates and bicarbonates, for example sodium carbonate and sodium bicarbonate, carbon dioxide, and compounds that generate carbon dioxide in situ, for example diethyl carbonate.

Small proportions, for example less than 1% by weight of the calcium salt in the reaction mixture, of soluble lead barium or strontium salts may be added to the latter if desired. Their effect is to encourage the formation of the aragonite phase rather than the calcite or vaterite phases.

EXAMPLE 1

20 litres of 0.10 molar calcium chloride solution were heated to 80° C. and maintained at that temperature whilst 20 litres of 0.10 molar sodium carbonate solution at 20° C. were added at a rate of 70 mls. per minute. The reaction mixture was well agitated throughout the total addition time of nearly 5 hours after which it was filtered and the filter cake dried. The product comprised aragonite crystals of which over 80% by weight had minor axes of 0.10 to 3 microns and major axes of 10 to 100 microns with a mean of 1 to 2 microns for the minor and 35 microns for the major axes.

The supersaturation ratio with respect to calcium carbonate was between 1.1 and 1.5 during the experiment.

EXAMPLE 2

This example comprises five experiments similar to that described in Example 1 in all respects except the rate of addition of the sodium carbonate solution. The results given in the table show how slow generation of carbonate ions in the reaction system favours the formation of long crystals.

TABLE

| Rate of addition of 0.10 M. Na$_2$CO$_3$, mls./min. | Crystal dimensions in microns | |
|---|---|---|
|  | Minor axis | Major axis |
| 67 | 1–2 | 20–65 |
| 134 | 1–2 | 10–50 |
| 268 | 1–2 | 10–50 |
| 1,330 | 1–2 | 5–30 |
| 4,000 | 1–2 | 5–15 |

EXAMPLE 3

This example describes the preparation of needle-shaped aragonite is a continuous process. The calcium chloride solution was the liquor from the ammonia-recovery stage of an ammonia-soda process and contained approximately 11% by weight of CaCl$_2$. The source of carbonate ions was a 1.0 molar solution of sodium carbonate. Both solutions were used at 80° C. They were fed separately into a reactor consisting of a cylindrical vessel having a conical base and fitted with a top section of wide diameter to act as a clarification zone. Clear liquor from the top section of the reactor was pumped into the cone at the base of the vessel so that there was an upflow of liquor in the vessel. The two reagent solutions at 80° C. were fed at equal rates (20 mls./min.) into the base of the reactor. Precipitation occurred and a fluidised crystal bed formed. The conditions were maintained as follows:

(1) Solids concentration in the bed—20% w./w.
(2) Temperature—80° C.
(3) pH mother liquor—7.8–8.5.

Solids were withdrawn from the bed at a rate such that the concentration of crystals was held at 20% w./w.

The product consisted of greater than 90% of the aragonite phase of calcium carbonate (as indicated by X-ray powder data) in the form of needle-shaped crystals having average dimensions of 1.0 micron minor axis and 30 microns major axis, the range being minor axis 1 to 2 microns and major axis 10 to 100 microns.

What I claim is:

1. A process for making precipitated calcium carbonate in the aragonite phase and possessing a markedly needle-shaped crystal form having minor axes of 0.10 to 3.0 microns and major axes of 10 to 100 microns, the steps consisting essentially of adding a source of carbonate ions selected from the group consisting of soluble carbonates and bicarbonates and carbon dioxide to an aqueous solution of a water soluble calcium salt, maintaining the temperature of the reaction mixture above 70° C. and controlling the rate of generation of carbonate ions in the reaction mixture so that the supersaturation ratio with respect to calcium carbonate, which is the ratio of the concentration of dissolved calcium carbonate in the system at any time and at any given temperature to the equilibrium concentration of dissolved calcium carbonate in the system at the same temperature, is from 1 to 5.

2. A process as claimed in claim 1 in which said supersaturation ratio is from 1.1 to 2.0.

3. A process as claimed in claim 2 in which the calcium salt is calcium chloride.

4. A process as claimed in claim 3 in which the calcium chloride is in the form of the liquors produced in the ammonia-recovery stage of the ammonia-soda process.

References Cited

UNITED STATES PATENTS

| | | | |
|---|---|---|---|
| 2,941,860 | 6/1960 | Annis | 23—66 |
| 2,981,596 | 4/1961 | McClure | 23—66 |
| 3,120,426 | 2/1964 | Crawford, Jr. | 23—66 |

OTHER REFERENCES

Mellor, J. W.: "Comprehensive Treatise on Inorganic and Theoretical Chemistry," vol. III, 1923, pp. 817–18.

EARL C. THOMAS, Primary Examiner

G. ALVARO, Assistant Examiner

U.S. Cl. X.R.

23—89